Figure 1:
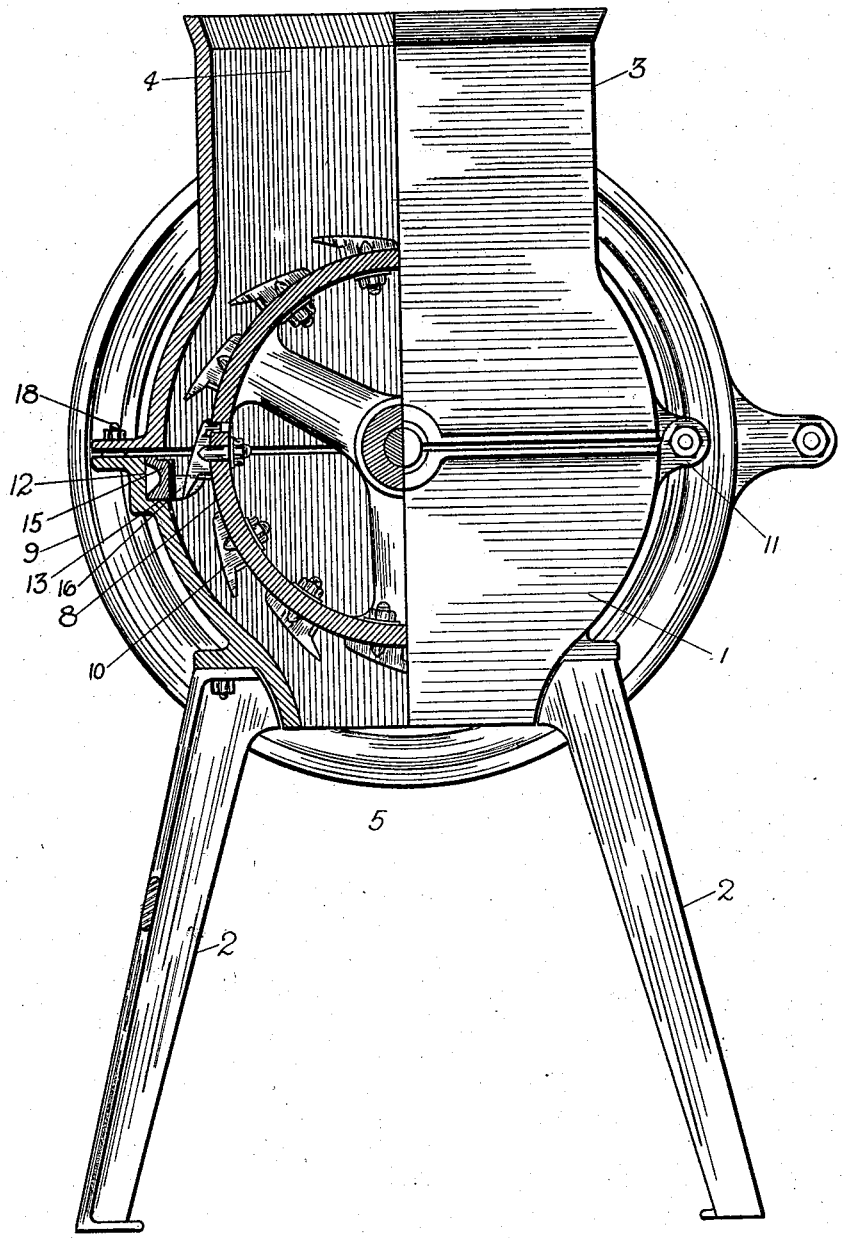

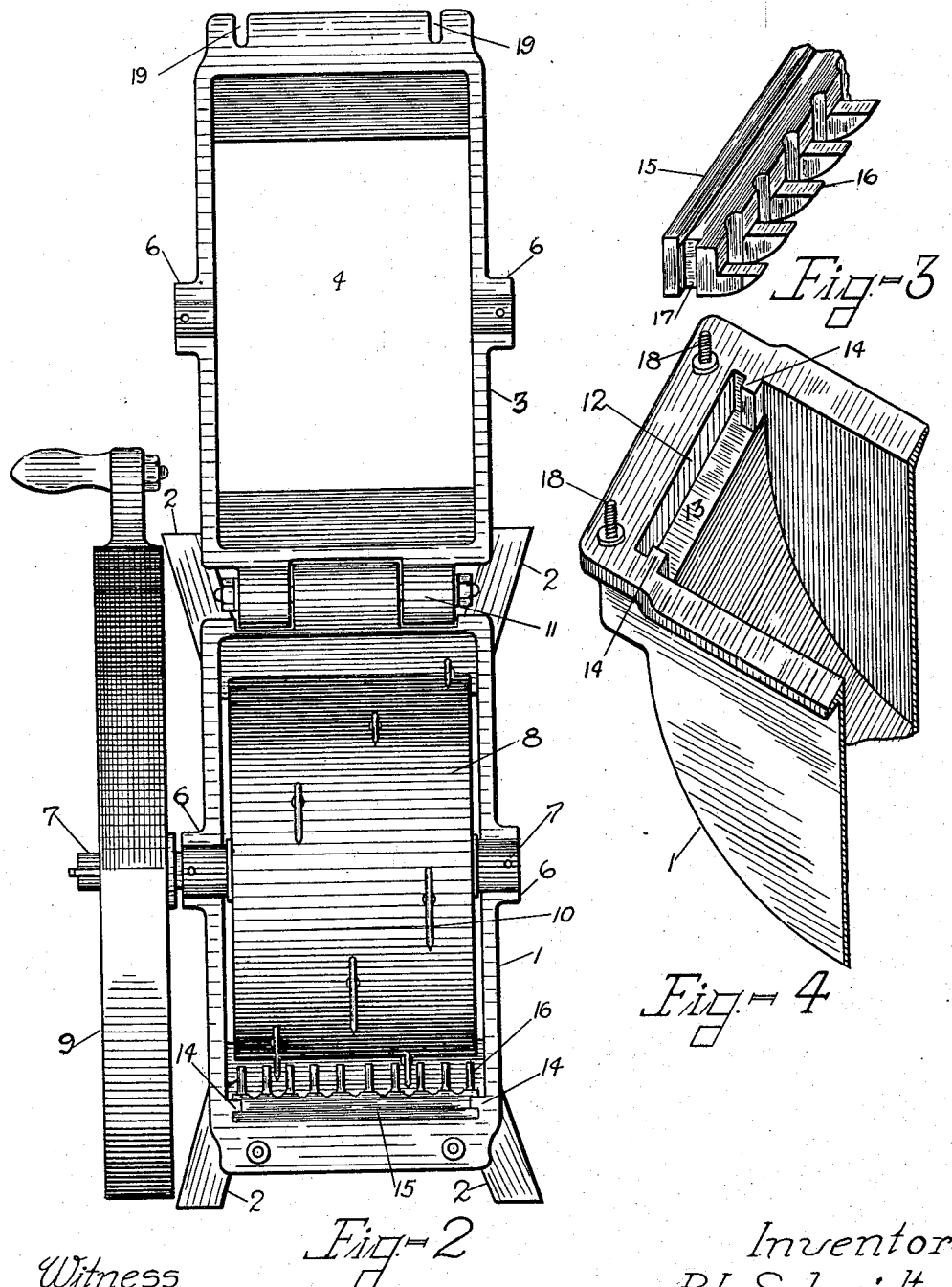

UNITED STATES PATENT OFFICE.

BERNHARD L. SCHMIDT, OF DAVENPORT, IOWA, ASSIGNOR TO B. L. SCHMIDT COMPANY, OF DAVENPORT, IOWA, A CORPORATION OF SOUTH DAKOTA.

ICE-CHIPPING MACHINE.

1,190,330.   Specification of Letters Patent.   Patented July 11, 1916.

Application filed March 25, 1915. Serial No. 16,828.

*To all whom it may concern:*

Be it known that I, BERNHARD L. SCHMIDT, a citizen of the United States of America, and resident of Davenport, Scott county, Iowa, have invented a certain new and useful Improvement in Ice-Chipping Machines, of which the following is a specification.

My invention relates to machines adapted to chip blocks of ice into small particles, and has for its principal object the providing of a mechanism capable of reducing large blocks of ice to lumps the size of walnuts and larger, such as is usually used in the manufacture of ice cream and for the icing of liquids in glasses and kindred uses, and which, by the substitution of simple parts easily and quickly effected, is capable of producing "shaved" or "snow" ice generally used in serving oysters, celery, radishes, etc., and for icing drinks at buffets, cafés and soda fountains.

Another object is to provide a machine requiring a minimum amount of power simple and substantial in form and of great capacity.

With these objects in view my invention consists in certain novel features of construction hereinafter described and shown in the accompanying drawing in which—

Figure 1 is a side elevation of my improved machine partly in section. Fig. 2 is a top plan view thereof with the upper half of the casing swung back on its hinge. Fig. 3 is a perspective view of the removable grate used in my device. Fig. 4 is an enlarged view in perspective of a detail.

In these drawings, in which similar reference numerals refer to similar parts throughout the several views, I have illustrated the preferred form of my invention and show the same as comprising a casing or body portion made in two parts, the lower part 1 with its legs 2 forming the main frame, to which is hinged the upper or hopper portion 3. The hopper portion is provided with a large mouth or opening 4 permitting the insertion of a large sized cake of ice. The chipped ice is discharged through the opening 5 in the lower part of the casing. The legs 2 are given considerable spread to admit of the placing of a tub or other receptacle to receive the chipped ice.

Journaled in the bearings 6 which are formed half and half in the top and bottom portions of the casing is the shaft 7 on which is mounted the cylinder 8 within the casing and the fly-wheel 9 on the outside of the casing. As the cylinder and its teeth 10 form the subject matter of a co-pending application, Serial Number 16,827, further description is deemed unnecessary. The upper portion of the casing is capable of being swung back off of the lower portion through the medium of the hinge 11.

Formed in the forward part of the lower case 1 is the recess 12 in which is formed the ledge 13 and the vertical side lugs 14. Fitted in this recess is the grate 15 which is provided with the forwardly extending teeth 16 and the vertical side grooves 17 which engage the lugs 14 when in position in the recess 12.

It will be observed that when the upper case is in position on top of the lower case and bolted down by the studs 18 which enter the slots 19, the grate 15 is firmly locked in position and can be readily removed and replaced by simply raising the upper case. The vertical side lugs 14 and the coöperating vertical grooves in the grate firmly retain the grate in position and prevent its tilting under pressure imposed upon the teeth, and, furthermore, prevent any movement in direction of the cover, with a tendency of prying it open when the device is operating.

The cylinder 8 may be revolved by hand power through the medium of handle 20 attached to or made integral with the fly wheel 9, or may be driven by power by substituting a band wheel for the fly-wheel to be driven by a belt or motor. Or the shaft may be extended and provided with a pulley at one end and a fly-wheel at the other.

In former ice chipping machines, wherein the removable grate 15 as shown was not employed, no uniformity in the size of the particles of crushed ice could be secured. Particles of all sizes would result, varying from small pieces as limited by the space between the end of the cylinder picks and the inner wall of the casing, to large pieces as limited by the space between the picks themselves and the space between the outer surface of the cylinder and the inner surface of the casing. By interposing the removable grate 15 in the path of the revolving picks, causing the picks to pass between the teeth extending from the grate with but a little more clearance at the sides and end than necessary to prevent interference, and by the employment of a cylinder of a diameter to bring the outer face thereof within close proximity to the free ends of the grate teeth, an absolutely uniform grade of chipped ice is secured. In fact, the clearance at the sides and ends of the picks can be so limited that "shaved" or "snow" ice will result. By substituting a cylinder of less diameter but with picks of the same length, and a grate with teeth somewhat longer much coarser ice will result.

The providing of grates to be interposed in the path of travel of the picks, having teeth of different lengths, which grates can be quickly and easily removed and replaced, in connection with cylinders of different diameter which can also be readily and quickly removed and exchanged is the principal feature of my invention. One machine equipped with an extra cylinder and grate can produce both "shaved" and "coarse" ice.

What I claim as new is:

1. In a combined ice shaving and chipping machine, a two-part casing having a hopper-like inlet in its upper part and a discharge opening at the bottom of its lower part, a pocket formed in said lower part at the dividing line between the parts, a grate formed with a solid portion having spaced teeth projecting from one side thereof, and coöperating interlocking means formed integrally within said pocket and said grate for preventing the tilting of the grate in said pocket under a downward pressure upon the teeth, and also for positively securing said grate against inward movement and allowing it to be bodily removed when the upper part of the casing is displaced and a cylinder rotatively mounted in said casing and provided with teeth to coöperate with the teeth on said grate.

2. In a combined ice shaving and chipping machine, a casing of substantially cylindrical form having a hopper like inlet at the top and a discharge opening at the bottom, an off-set or pocket extending transversely of the casing at about its longitudinal diameter, having a floor or ledge and vertically disposed lugs extending inwardly from the sides thereof, a grate provided with teeth projecting from one side thereof and vertically extending slots in each end, said grate adapted to slip into said pocket with its end slots engaged by said lugs, a cylinder rotatably mounted in said casing provided with outwardly extending picks arranged to pass between the teeth of said grate when the said cylinder is rotated.

Signed by me at Davenport Iowa this 22nd day of March 1915.

BERNHARD L. SCHMIDT.

Witnesses.
  CARRIE L. VAN TUYL,
  WALTER M. BALLUFF.